May 23, 1961  L. F. BIRD  2,985,817
AUTOMATIC VOLTAGE REGULATING CIRCUIT
Filed Jan. 7, 1958

INVENTOR
LESTER F. BIRD
BY Karl Huber
James E. Bryan
ATTORNEYS

United States Patent Office 2,985,817
Patented May 23, 1961

2,985,817
AUTOMATIC VOLTAGE REGULATING CIRCUIT
Lester F. Bird, Newark, N.J., assignor to Engelhard Hanovia, Inc., a corporation of New Jersey
Filed Jan. 7, 1958, Ser. No. 707,495
5 Claims. (Cl. 323—56)

The present invention deals with an automatic voltage regulating circuit and more particularly to an automatic voltage regulating circuit that will deliver steady and unvarying voltage to a connected load from supply voltages that vary either above or below a normal value.

Figure 1:
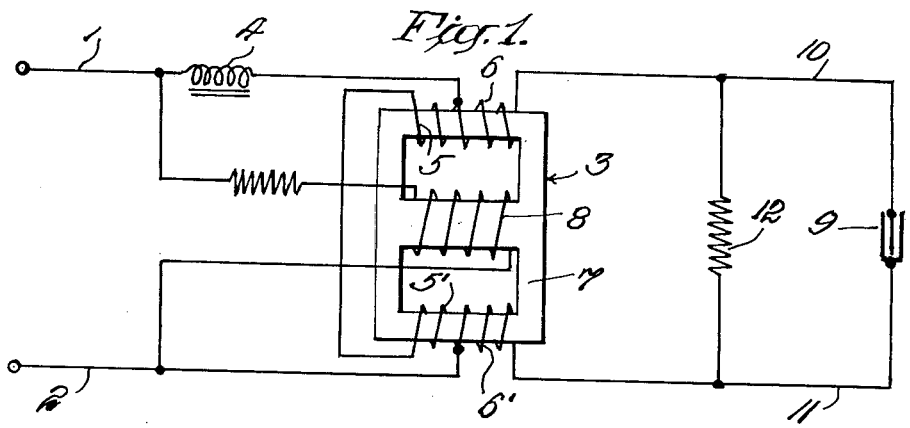
Figure 2:
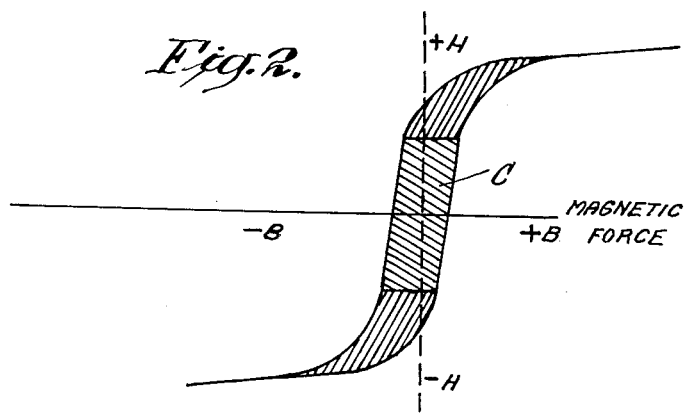
Figure 3:
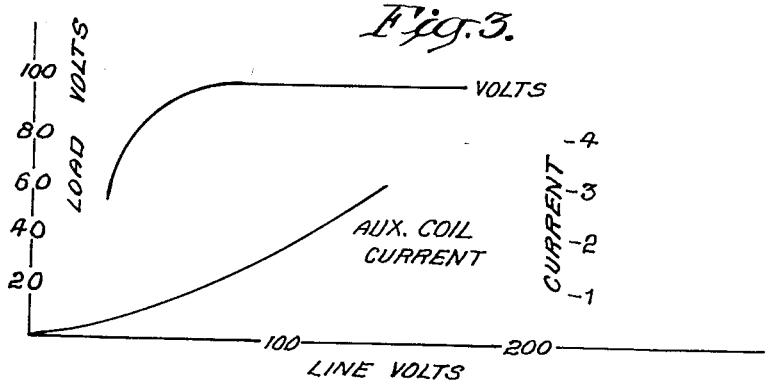

It is an object of the invention to provide a voltage regulator which utilizes power from a supply line at high power factor and high efficiency. It is another object of the invention to provide a voltage regulator having a minimum of energy storage in the component parts thereof. It is a further object of the invention to provide a voltage regulator which has minimum disturbances or transients in its output voltage regardless of sudden alterations or fluctuations in supply line voltage. Other objects and advantages of the invention will become apparent from the description hereinafter following and the drawings forming a part hereof, in which:

Figure 1 is a schematic illustration of a regulator circuit according to the invention, Figure 2 is a graphic illustration of a hysteresis loop for the iron comprising the core of the transformer, and Figure 3 is a graphic illustration of the performance of the regulator circuit showing steady output voltage against variable input line supply voltage.

The invention deals with a regulator circuit comprising a particular transformer structure and associated windings, which, together with a conventional type reactor and capacitor constitute sufficient structure for providing the delivery of unvarying voltage to a load when the input voltage varies above and below the normal voltage value. The regulator circuit has at least two major improvements over the usual magnetic voltage stabilizers, including a minimum of bulk and a comparatively short recovery time from the effects of transients in the supply voltage.

Referring to Figure 1, supply lines 1 and 2 are of fixed frequency and varying voltage. They are connected to the primary winding of a three legged autotransformer 3 having in series with line 1 a series reactor 4. The transformer 3 has a divided primary winding 5 and 5′ and a divided secondary winding 6 and 6′. The windings 5 and 5′ are poled to produce magnetic flux which is additive in the peripheral magnetic core loop and which produces substantially no net flux in the central leg of the core. The windings of transformer 3 are mounted upon a closed type of magnetic core structure 7 of thin laminated steel. A separate coil 8 is mounted upon the middle leg of the core structure. A capacitor 9 is connected across a portion of the split secondary coils. For purposes of illustration the output leads 10 and 11 are shown connected to a power consuming load 12. It is possible to deliver power to the load 12 from the magnetic core structure either by magnetically induced windings or through capacitative or other coupling arrangements.

Reactor 4 may be air or iron core design and should have a reactance that is not altered by normal current variations occurring from operation of the circuit.

It is not necessary that the transformer be of the "auto" type since the input windings may be wound separate from the secondary windings according to well known practice.

Figure 2 illustrates a diagrammatic hysteresis loop for the core iron. The instantaneous flux densities are plotted along the vertical axes +H and —H and the magnetic forces along the horizontal axes +B and —B.

Since voltage across a coil wound upon such a core follows closely the changes in magnetic flux through it the voltage can be assumed to be equivalent to the maximum vertical height of the hysteresis loop. Any factor that is introduced altering the height of the loop automatically alters the developed voltage. Changes in the amount of iron in the core is such a factor and a removal of a portion of the iron will reduce the range of possible flux change, which is equivalent to the removal of the area C of the hysteresis loop.

Because there are definite limits to the flux that can be carried by the iron, the introduction of flux from an external source will reduce the flux change available to the regular source and reduce the possible voltage across the coil. The addition of this external flux has the same effect as the reduction in quantity of core iron. It is possible therefore to control the voltage across the coil by the addition and subtraction of magnetic flux from an external source.

The auxiliary winding upon the transformer core of the invention is such an independent source of flux to the transformer core and is able therefore to control the voltage of the coil. By connecting this auxiliary winding back to the supply voltage a result is achieved in which the voltages of the transformer coils are subject in some measure to variations in the supply line voltages.

Figure 1 illustrates a circuit having a supply voltage source, a series reactor, a transformer, a capacitor and a power consuming load. The transformer is normal except for the form of the core structure. If the transformer is assumed to be ideal in its properties the circuit can be considered as a series reactor in series with a capacitor. The parallel combination of the auto transformer and the capacitor are assumed to act as if they were a capacitor of an adjusted value.

For convenience, the reactance of an inductance is considered algebraically as a positive quantity. The reactance of a capacitor is considered to be negative. In such a series circuit these reactances are added algebraically to determine the total reactance of the circuit. If the algebraic sum of these reactances should be a low figure there would be but little impedance to limit the flow of current. As a result the currents would become very large and the voltages across the circuit elements rise to high values.

In the circuit of the invention, however, the capacitor is shunted by the windings of the transformer. The possible voltages that can be developed by the capacitor are limited by the restrictions imposed by the voltage handling abilities of the transformer coil.

As the impressed voltage across the transformer is increased, the magnetizing currents are increased and, as a condition of saturation is approached in the core iron, these currents increase rapidly with increasing voltage.

The magnetizing currents are of essentially opposite phase to the normal capacitative currents and have the effect of reducing the effective value of the capacitor.

In the series circuit a reduction in the value of the capacitor automatically increases the circuit reactance and reduces the current. A condition of balance is produced in the system where the currents and the changing reactances are stabilized. The voltages across the capacitor and transformer coil are stabilized at the same time with only a small variation in capacitor voltage remaining as a result of line voltage changes. The capacitor voltage still increases slightly with increasing line voltage and falls slightly with falling line voltages.

It is necessary if the output voltage is constant and independent of the variations in supply line voltage that some additional feature be added to the system to eliminate the small changes in voltage across the capacitor. I have provided such a feature in the auxiliary winding across the middle leg of the transformer core.

The auxiliary winding is connected back to the supply line voltage and therefore its currents and voltage vary with that of the line. The magnetic effects of the winding appear in the flux of the core in opposition to the main flux. At the time when the capacitor voltage would normally rise due to increasing line voltage the currents in the auxiliary winding are increased and the resultant flux increases the saturation alternately first in one and then in the other of the two outer legs of the transformer. This eliminates the expected change in capacitor voltage. Likewise, if the supply voltage is decreased and a fall in capacitor voltage might result, the flux from the auxiliary winding is reduced and eliminates the expected change from the capacitor voltage. It is possible by this invention to have the output voltage remain constant and unaffected by variations occurring in the supply voltages.

When a sudden transient causes an abrupt change in the supply voltage the usual magnetically controlled voltage regulator permits a transient to pass through to the load circuit. The severity and duration of this transient varies with the construction of the regulator but is commonly of from seven to twenty cycles in length before the output voltage is again in a steady state. With the circuit of the invention this recovery time is materially shortened and the amplitude of the transient reduced. The reason for this performance lies in the use of the auxiliary winding connected to the supply line. The transient is applied to the core of the transformer from both directions simultaneously and, as a result it is cancelled out of the capacitor voltage.

Various modifications of the invention are contemplated within the scope of the appended claims.

What is claimed is:

1. An automatic voltage regulating circuit comprising a transformer having a closed type three-legged core, the legs being spaced from each other, primary and secondary windings on the outer legs of said core, input leads connected to said primary windings, a series reactor in at least one of said leads, output leads connected to said secondary windings, a load and capacitor connected across said secondary leads in parallel relationship, an auxiliary winding on the transformer leg between said outer legs, and means for applying alternating current power signals to said auxiliary winding.

2. An automatic voltage regulating circuit according to claim 1, wherein said primary and secondary windings are autotransformer windings on each of said outer legs, the primary windings being electrically connected to each other.

3. In combination, a magnetic core including first and second magnetic loops having a common portion, primary and secondary windings mounted on the individual portions of said first and second loops, means for energizing said primary windings from a source of alternating current to produce magnetic flux in the saturation region in the individual portions of said first and second magnetic loops and to provide substantially zero magnetic flux in the common portion of said magnetic loop, an auxiliary coil mounted on the common portion of said core, and means for energizing said auxiliary coil from the same source of alternating current which is energizing said primary windings.

4. A regulation circuit comprising a magnetic core including first and second magnetic loops having a common portion, primary windings mounted on the individual portions of said first and second magnetic loops, means for energizing said primary windings from a source of alternating current to produce magnetic flux in the saturation region in the individual portions of said first and second magnetic loops and to provide substantially zero magnetic flux in the common portion of said magnetic loop, an auxiliary winding mounted on the common portion of said core, and means for energizing said auxiliary coil from the same source of alternating current which is energizing said primary windings.

5. An automatic voltage regulating circuit comprising a magnetic core including first and second magnetic loops having a common portion, primary and secondary windings mounted on the individual portions of said first and second magnetic loops, means for energizing said primary windings from a source of alternating current to produce magnetic flux in the saturation region in the individual portions of said first and second magnetic loops and to provide substantially zero magnetic flux in the common portion of said magnetic loop, an auxiliary winding mounted on the common portion of said core, means for energizing said auxiliary coil from the same source of alternating current which is energizing said primary windings, a reactor connected in series with one of said primary windings, and a load and capacitor connected to said secondary windings.

References Cited in the file of this patent

UNITED STATES PATENTS

| | | |
|---|---|---|
| 2,338,080 | Brown | Dec. 28, 1943 |
| 2,399,185 | Hedding | Apr. 30, 1946 |
| 2,481,644 | Callaway | Sept. 13, 1949 |